United States Patent [19]

Kelly

[11] Patent Number: 5,003,852
[45] Date of Patent: Apr. 2, 1991

[54] BUTTON DIE HOLDER

[76] Inventor: Michael J. Kelly, 10422 Homeland Ave., Whittier, Calif. 90603

[21] Appl. No.: 78,168

[22] Filed: Jul. 27, 1987

[51] Int. Cl.⁵ .................................................. B23G 5/00
[52] U.S. Cl. ........................................... 82/158; 82/110
[58] Field of Search ............................ 82/5, 5.5, 36 R; 408/203.5, 204, 205, 206, 207, 208, 209

[56] References Cited

U.S. PATENT DOCUMENTS

| | | | |
|---|---|---|---|
| 2,130,528 | 9/1938 | Alexander | 82/5 |
| 2,383,991 | 9/1945 | Sarossy | 82/5 |
| 2,875,661 | 3/1959 | Fougeray Du Coudrey | 82/5 |
| 3,308,695 | 3/1967 | Hagerman | 82/5 |
| 4,085,545 | 4/1978 | Da Silva | 408/206 |

Primary Examiner—Frederick R. Schmidt
Assistant Examiner—Blynn Shideler
Attorney, Agent, or Firm—Leon Gilden

[57] ABSTRACT

A die holder comprises a die housing and a guide bar. The guide bar is designed to be retained within a Jacob's chuck retained within a lathe tailstock, and the die housing is slidably movable along the guide bar. A button die is retained within the die housing and with the guide bar aligned with the bar stock workpiece held by the lathe headstock, the die housing may be brought into engagement with the workpiece so that the button die engages the same. A user may then grasp the die holder while the headstock and workpiece are rotating so as to effect a cutting of threads. A reverse rotation of the headstock will result in a disengagement of the die holder.

1 Claim, 2 Drawing Sheets

BUTTON DIE HOLDER

BACKGROUND OF THE INVENTION

1. Field of the Invention

The present invention relates to threading devices, and more particularly pertains to a new and improved button die holder which is designed to be utilized on a metal cutting lathe.

2. Description of the Prior Art

The use of die holders for cutting threads on bar stock retained within the headstock of a metal cutting lathe is well known in the prior art. For example, reference is made to U.S. Pat. No. 2,383,991, which issued to A. Sarossy on Sept. 4, 1945. The Sarossy device, while being functional for its intended purpose, possesses several disadvantages. In this respect, the device includes a die housing which is slidably movably received upon a guide bar. The guide bar in turn is retained within a tailstock during a use of the die holder. A button die is retained within the die housing, and the housing includes a knurled gripping surface. One obvious disadvantage experienced by the Sarossy die holder is its inherent instability since the guide bar is positionable for only a short distance within the die housing due to an incorporated lip structure which serves as a stop. As can be appreciated, a substantial amount of torque is experienced on a die holder during a cutting of threads on bar stock, and it would be desirable to have the guide bar move substantially completely through the die housing during a use of the holder. This of course lessens the chance of distorted thread formation as can be occasioned by the applied torque upon the die holder. As such, some binding or distorted thread formation can be expected when utilizing the Sarossy device.

Accordingly, it can be appreciated that there exists a continuing need for new and improved die holders which are utilizable with a lathe wherein such holders would be more stable during a use thereof, and in this respect, the present invention addresses this need.

SUMMARY OF THE INVENTION

In view of the foregoing disadvantages inherent in the known types of die holders now present in the prior art, the present invention provides an improved die holder construction wherein the same can be retained within the tailstock of a lathe and can be manually manipulated to effect a cutting of threads on a bar stock retained within a headstock. As such, the general purpose of the present invention, which will be described subsequently in greater detail, is to provide a new and improved die holder which has all the advantages of the prior art die holders and none of the disadvantages.

To attain this, the present invention comprises a die holder which includes a die housing slidably movable upon a guide bar. The guide bar is designed to be retained within a Jacob's chuck forming a part of a lathe tailstock, and the cylindrically shaped die housing includes an axially aligned through-extending aperture for receiving the guide bar. A button die may be retained by threaded fasteners in one end of the die housing, and the guide bar can be moved through the housing so as to abut directly against the button die. A knurled surface on the housing allows a manual threading of bar stock as the stock rotates within a headstock, and a release of the housing will in effect allow it to rotate with the stock. The housing may be removed by holding it in a fixed position while reversing the direction of rotation of the bar stock.

To add stability to the invention and as aforementioned, the guide bar is slidably positionable through substantially the entire length of the die housing. Further, a center bore part of the guide bar is drilled out so as to form a bar stock receiving cavity which extends along a substantial axial length portion of the guide bar. Accordingly, the tailstock can continue to be advanced during a threading of the workpiece, thereby to provide additional stability to the die housing while the workpiece moves inside the bore portion of the guide bar. In the preferred embodiment, the present invention envisions the use of three different die housings which operably retain five different sizes of button dies, although only one button die can be used at any time. Further, the button die holder comprising the invention can also be used by hand, e.g., to clean threads in difficult to reach locations.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved button die holder which has all the advantages of the prior art button die holders and none of the disadvantages.

It is another object of the present invention to provide a new and improved button die holder which may be easily and efficiently manufactured and marketed.

It is a further object of the present invention to provide a new and improved button die holder which is of a durable and reliable construction.

An even further object of the present invention is to provide a new and improved button die holder which is susceptible of a low cost of manufacture with regard to both materials and labor, and which accordingly is then susceptible of low prices of sale to the consuming public, thereby making such button die holders economically available to the buying public.

Still yet another object of the present invention is to provide a new and improved button die holder which provides in the apparatuses and methods of the prior art some of the advantages thereof, while simultaneously overcoming some of the disadvantages normally associated therewith.

Still another object of the present invention is to provide a new and improved button die holder which is particularly designed for use on a metal lathe.

Yet another object of the present invention is to provide a new and improved button die holder which provides for substantial stability of a die housing associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
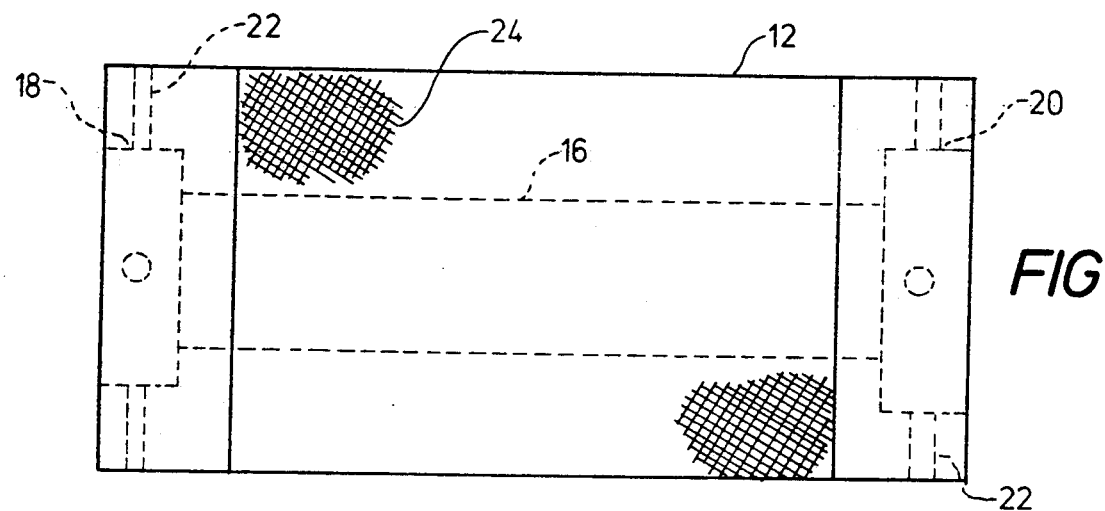
FIG. 1 is a side elevation view of the die housing forming a part of the present invention.

With reference now to the drawings, and in particular to FIGS. 1-5 thereof, a new and improved button die holder embodying the principles and concepts of the present invention and generally designated by the reference numeral 10 will be described.

Figure 2:
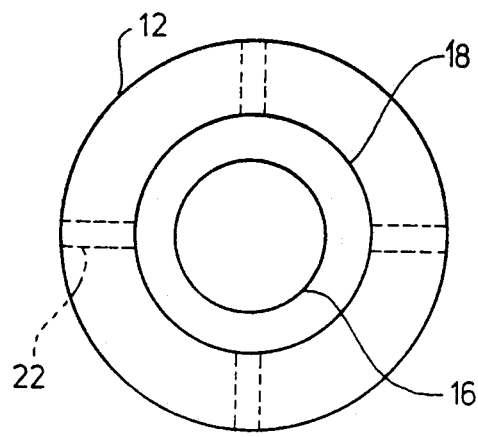
FIG. 2 is a left end elevation view of the housing.
Figure 3:
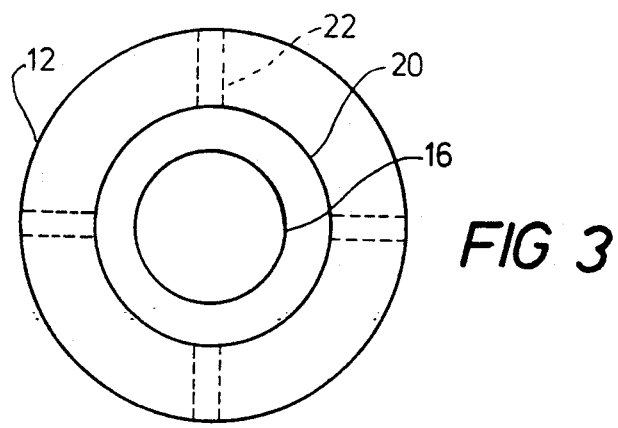
FIG. 3 is a right end elevation view of the housing.

More specifically, it will be noted that the button die holder 10 essentially includes a die housing 12 and a guide bar 14. As shown in FIGS. 1, 2 and 3, the die housing 12 is of a cylindrical shape and includes a through-extending axially aligned aperture or bore 16. The bore 16 is expanded into a greater width portion 18 at one end of the housing 12, with the same width expansion defining a second expanded portion 20 at the other end of the housing. As can be appreciated, the expanded width portions 18, 20 are designed to receive different diameter conventional button dies and in particular to accommodate different manufactured brands thereof. As is apparent, a button die may be inserted in one of the bores 18, 20, and a plurality of threaded radially extending apertures 22 facilitate the use of setscrews or the like to effectively retain a die in fixed engagement with the housing 12. Inasmuch as the die housing 12 is designed to be manually engagable with a workpiece to effect the cutting of threads thereon, an outer knurled surface 24 is provided around a circumferential portion of the housing. This surface 24 facilitates a gripping of the housing 12 by a user in a manner which will be subsequently described.

Figure 4:
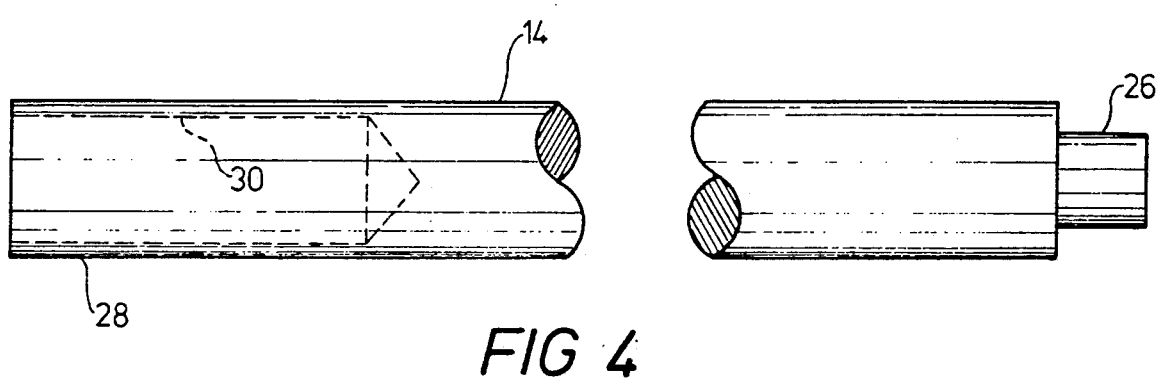
FIG. 4 is a side elevation view of the guide bar forming a part of the present invention.
Figure 5:
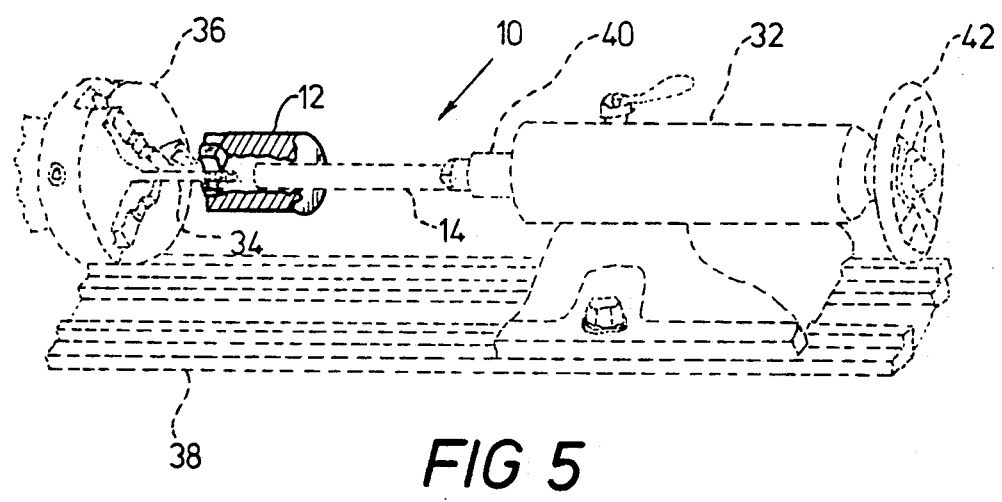
FIG. 5 is a perspective view of the invention showing the same assembled on a metal cutting lathe.

As illustrated in FIG. 4, the guide bar 14 is designed to be retained within a Jacobs chuck forming a part of a lathe tailstock. More specifically, a first end 26 of the guide bar 14 is retained within a tailstock during a use thereof, with the opposed end 28 then being positionable within the bore 16 forming a part of the die housing 12. The bar end 28 is slidably positionable within the bore 16 and can extend completely through the housing 12 until it abuts against a button die retained within one of the bores 18, 20. As further illustrated in FIG. 4, the end 28 of the guide bar 14 includes an axially aligned bore 30 which is of a sufficient size to receive a workpiece during a thread cutting operation, while not being so large in diameter as to substantially effect the rigidity of the guide bar 14. In an alternative embodiment of the invention, the bore 30 can be dispensed with so that the guide bar 14 comprises a substantially solid construction.

As to the manner of usage and operation of the invention 10, the same should be apparent from the above description. However, a brief summary thereof will be provided. In this respect, reference is made to FIG. 5 of the drawings wherein the guide bar 14 is illustrated as being in fixed engagement with a tailstock 32. As shown, a bar stock workpiece 34 is retained within a headstock 36, with the workpiece rotating concurrently with the headstock when power is supplied to the lathe 38. Presuming that a button die is retained within one of the bores 18, 20, a user of the invention 10 needs only to grasp the die housing 12 and bring it into engagement with the bar stock workpiece 34. During this engagement, the end 28 of the guide bar 14 will effectively abut against a back side of the retained button die. When the user prevents rotation on the die housing 12 by grasping the knurled surface 24, a threading operation of the workpiece 34 will commence. As the housing 12 slides along the guide bar 14, the workpiece will move into the bore 16 forming a part of the housing. To maintain stability, the user can periodically cut off the power to the lathe 38 and advance the tailstock 32 whereby the threaded end of the workpiece 34 will be retained within the bore 30 of the guide bar 14. When power is resupplied to the lathe 38, the die housing 12 will rotate with the workpiece 34 until the user again grasps the knurled surface 24. After the desired length of threads has been cut, the direction of rotation of the headstock 36 can be reversed and by a further grasping of the knurled surface 24, the die housing will be easily removed from the workpiece 34.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. A new and improved button die holder for use with a metal cutting lathe, said die holder comprising:
    die housing means for holding a button die: and guide bar means upon which die housing means is slidably positioned, said guide bar means serving to guide said die housing means and said button die into a thread cutting engagement with a workpiece operably mounted in said lathe, said guide bar means being slidably positionable through substantially an entire length portion of said die housing means, thereby to provide maximum stability to said die during said thread cutting engagement, and wherein said guide bar means is selectively abutable against said button die retained within said die housing means, and wherein said die housing means is of a cylindrical construction and includes a through-extending axially aligned aperture in which said guide bar means is positioned, and wherein said guide bar means is of a cylindrical construction and is designed to be retained within a tailstock associated with said lathe, and wherein said workpiece is retained within a headstock associated with said lathe, and wherein said workpiece extends into an interior portion of said die housing means during said thread cutting engagement, and wherein said interior portion comprises said aperture, and wherein said guide bar means is provided for with an axially aligned forwardly positioned bore which defines a hollow interior portion of said guide bar means, and wherein said guide bar means remains substantially positioned within an entire length portion of said aperture.

* * * * *